US011407069B2

(12) United States Patent
Misumi et al.

(10) Patent No.: US 11,407,069 B2
(45) Date of Patent: Aug. 9, 2022

(54) FLUX AND SOLDER COMPOSITION

(71) Applicant: KOKI COMPANY LIMITED, Tokyo (JP)

(72) Inventors: Yuri Misumi, Tokyo (JP); Takeshi Yahagi, Tokyo (JP); Motohide Sasaki, Tokyo (JP); Tatsuya Baba, Tokyo (JP); Kazuma Karube, Tokyo (JP)

(73) Assignee: KOKI COMPANY LIMITED, Tokyo (JP)

( * ) Notice: Subject to any disclaimer, the term of this patent is extended or adjusted under 35 U.S.C. 154(b) by 216 days.

(21) Appl. No.: 16/476,363

(22) PCT Filed: Jan. 15, 2018

(86) PCT No.: PCT/JP2018/000785
§ 371 (c)(1),
(2) Date: Jul. 8, 2019

(87) PCT Pub. No.: WO2018/135426
PCT Pub. Date: Jul. 26, 2018

(65) Prior Publication Data
US 2020/0094354 A1    Mar. 26, 2020

(30) Foreign Application Priority Data

Jan. 17, 2017   (JP) ................ 2017-006033

(51) Int. Cl.
*B23K 35/362*   (2006.01)
*B23K 35/26*    (2006.01)
*C22C 13/00*    (2006.01)

(52) U.S. Cl.
CPC .......... *B23K 35/362* (2013.01); *B23K 35/262* (2013.01); *C22C 13/00* (2013.01)

(58) Field of Classification Search
CPC ............................ B23K 35/362; C22C 13/00
USPC ............................................. 75/303
See application file for complete search history.

(56) References Cited

FOREIGN PATENT DOCUMENTS

| JP | H06246481 A | 9/1994 |
| JP | H06296072 A | 10/1994 |
| JP | H0952195 A | 2/1997 |
| JP | 3155778 B2 | 4/2001 |
| JP | 2001138089 A | * | 5/2001 |
| JP | 2001138089 A | | 5/2001 |
| JP | 2007222932 A | | 9/2007 |
| JP | 2015080814 A | * | 4/2015 |

(Continued)

OTHER PUBLICATIONS

International Search Report (Form PCT/ISA/210) for International Patent Application No. PCT/JP2018/000785, issued from the Japan Patent Office, dated Apr. 10, 2018, 4 pages.

*Primary Examiner* — Weiping Zhu
(74) *Attorney, Agent, or Firm* — Kilyk & Bowersox, P.L.L.C.

(57) ABSTRACT

A flux containing terpene phenolic resin and having an acid value of 120 mgKOH/g or more is provided. The acid value can be 250 mgKOH/g or less. The terpene phenolic resin can be contained by 0.05 mass % or more and 30 mass % or less. The flux can contain the terpene phenolic resin and another resin component as a rosin component, and an amount of the terpene phenolic resin contained in the rosin component can be 0.1 mass % or more and 80 mass % or less.

5 Claims, 2 Drawing Sheets

CHANGE IN VISCOSITY INCREASE RATE BETWEEN COMPARATIVE

(56) References Cited

FOREIGN PATENT DOCUMENTS

| JP | 2015080814 A | 4/2015 |
| JP | 2016159325 A | 9/2016 |

\* cited by examiner

FLUX AND SOLDER COMPOSITION

FIELD OF THE INVENTION

The present invention relates to a flux and a solder composition containing the flux.

BACKGROUND TO THE INVENTION

Solder, which is used to bond electronic components, for example, contains a solder composition containing a solder alloy and a flux. The flux is mixed in the solder composition for the purpose of improving the solderability. The flux contains various components such as a resin component, an activating component, a solvent component, an antioxidant component, and a thixotropic component.

The components of the flux, such as the resin component and the activating component, work to improve the solderability by removing an oxide film on a surface of the solder, a surface of a part to be bonded, a surface of a plated part of a substrate, or the like after the solder composition is applied. On the other hand, some of the flux components may react with the solder alloy and this reaction may increase the viscosity of the solder composition. In particular, the viscosity easily increases in continuous printing, for example, and the high viscosity may result in a printing error or the like. In view of this, a flux component that can suppress the change in viscosity when the flux component is used in the solder composition has been examined.

For example, Patent Document 1 describes a flux containing, as a thickening inhibiter, a carboxylic acid with a low disassociation constant, such as maleic acid. However, although the flux containing the carboxylic acid as above can improve the stability of the viscosity, the wettability as the solder composition is insufficient.

Patent Document 2 describes a flux mainly containing rosin that contains carboxylic acid ester and has particular softening point and acid value, and this flux can maintain the wetting and spreading property and improve the preservation stability. However, these fluxes are still insufficient in securing the stability of the viscosity while keeping the wettability, particularly securing the stability of the viscosity in the continuous use.

DOCUMENTS FOR PRIOR ART

Patent Document 1: JP 3155778 B2
Patent Document 2: JP 2016-159325 A

SUMMARY OF THE INVENTION

Problem to be Solved by the Invention

The present invention has been made in view of the problems of the prior art as described above, and an object is to provide a flux and a solder composition that can keep the solder wettability and stabilize the viscosity.

Means for Solving the Problems

The present invention provides a flux containing terpene phenolic resin and having an acid value of 120 mgKOH/g or more.

According to the present invention, terpene phenol is contained and the acid value is 120 mgKOH/g or more; therefore, if this flux is mixed in a solder composition, the viscosity can be stabilized while the solder wettability is kept.

In the present invention, the acid value may be 250 mgKOH/g or less.

In the present invention, the terpene phenolic resin may be contained by 0.05 mass % or more and 30 mass % or less.

In the present invention, the terpene phenol and another resin component may be contained as a rosin component, and an amount of the terpene phenol contained in the rosin component may be 0.1 mass % or more and 80 mass % or less.

The present invention provides a solder composition containing the flux and a solder alloy.

Effects of Invention

According to the present invention, a flux and a solder composition that can keep the solder wettability and stabilize the viscosity can be provided.

DETAILED DESCRIPTION OF THE INVENTION

Figure 1:
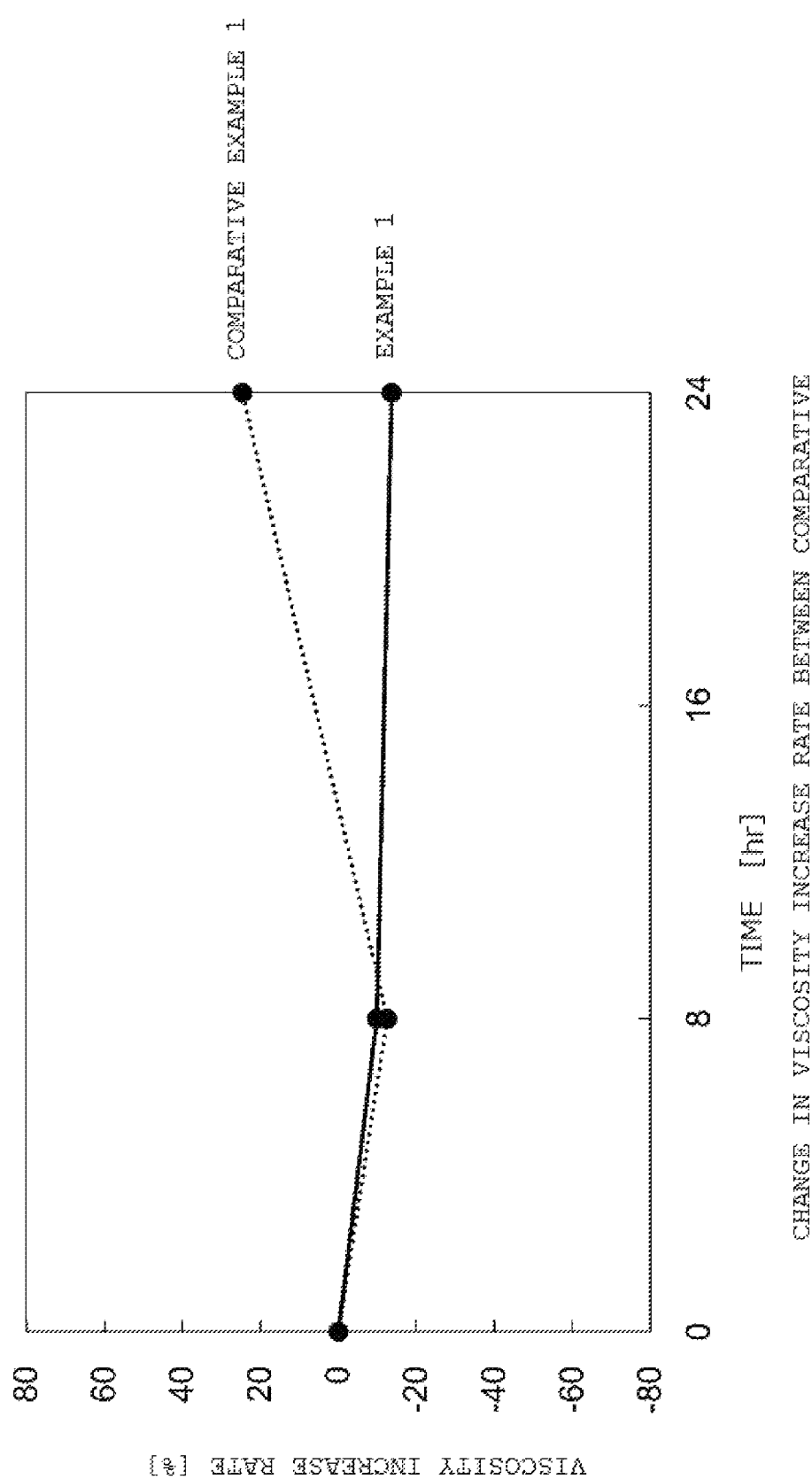
FIG. 1 is a graph showing a relation between the time and the viscosity of fluxes according to example and comparative example.

A flux and a solder composition containing the flux according to the present invention are described below.

The flux according to the present embodiment contains terpene phenolic resin and has an acid value of 120 mgKOH/g or more, preferably 160 mgKOH/g or more.

Alternatively, the flux according to the present embodiment contains terpene phenolic resin and has an acid value of 120 mgKOH/g or more and 250 mgKOH/g or less, preferably an acid value of 160 mgKOH/g or more and 250 mgKOH/g or less, and more preferably an acid value of 170 mgKOH/g or more and 240 mgKOH/g or less.

The terpene phenolic resin in the present embodiment is obtained by copolymerization of terpene monomer and a phenolic compound. Alternatively, the terpene phenolic resin in the present embodiment is obtained by copolymerization of terpene monomer, monomer other than the terpene monomer, and a phenolic compound. Further alternatively, the terpene phenol, which is resulted from the above polymerization, containing another component, for example, hydrogenated terpene phenol may be used.

Examples of the terpene monomer include hemiterpenes with 5 carbon atoms, such as isoprene, monoterpenes with 10 carbon atoms, sesquiterpenes with 15 carbon atoms, diterpenes with 20 carbon atoms, sesterterpenes with 25 carbon atoms, triterpenes with 30 carbon atoms, and tetraterpenes with 40 carbon atoms; however, the terpene monomer is not limited to these examples.

Examples of the phenolic compound include phenol, cresol, and xylenol; however, the phenolic compound is not limited to these examples.

Specific examples of the terpene phenolic resin include YS POLYSTER (terpene phenolic resin: YASUHARA CHEMICAL CO., LTD.), TAMANOL (terpene phenolic resin: Arakawa Chemical Industries, Ltd.), Terutac 80 (terpene phenolic resin: Nippon Terpene Chemicals, Inc.), and SylvaresTP (terpene phenolic resin: ARBROWN CO., LTD.) that are commercially available.

The amount of terpene phenolic resin contained in the flux is not limited to a particular amount; for example, the amount of terpene phenolic resin is 0.05 mass % or more and 30 mass % or less, preferably 0.1 mass % or more and 20 mass % or less.

If the amount of terpene phenolic resin contained in the flux is in the aforementioned range, the flux that has a higher effect of keeping the viscosity stability while keeping the solderability can be obtained.

The flux according to the present embodiment may contain, in addition to the terpene phenolic resin, known flux components such as a resin component other than the terpene phenolic resin, an activating component, a solvent component, an antioxidant component, and a thixotropic component (thixo component).

The flux according to the present embodiment may contain the terpene phenolic resin and another resin component as a rosin component.

The resin component other than the terpene phenolic resin is not limited to a particular resin component as long as the resin component is any known resin component that can be used as the resin component for the flux, such as synthetic resin or natural resin. For example, polymerized rosin, hydrogenated rosin, natural rosin, disproportionated rosin, acid-modified rosin, or the like is given.

Any of the aforementioned resins can be used alone or a plurality of kinds thereof may be used in mixture.

In this case, the amount of resin component contained in the flux is not limited to a particular amount; for example, the total of the resin component and the terpene phenolic resin is 1.0 mass % or more and 95 mass % or less, preferably 10 mass % or more and 50 mass % or less.

In addition, the amount of terpene phenolic resin contained in the rosin component may be 0.1 mass % or more and 80 mass % or less, preferably 5 mass % or more and 60 mass % or less.

In this manner, by containing the terpene phenol as a part of the rosin component of the flux, the flux can have a higher effect of keeping the viscosity stability while keeping the solderability further.

Note that the amount of terpene phenolic resin contained in the rosin component can be measured by a known analysis means such as gas-chromatography (GC-MS), Fourier-transform infrared spectroscopy (FT-IR), thermogravimetry/differential thermal analysis (TG-DTA) device, or a nuclear magnetic resonance (NMR) device.

The activating component is not limited to a particular component as long as the activating component is any known component that can be used as the activating component for the flux. For example, organic acid, amine halogen salt, vinyl ether polymer or the like can be used. Examples of the organic acid include glutaric acid, adipic acid, azelaic acid, sebacic acid, stearic acid, benzoic acid, dodecanedioic acid, succinic acid, maleic acid, and isocyanuric acid. Examples of the amine of the amine halogen salt include diethyl amine, dibutyl amine, tributyl amine, diphenyl guanidine, and cyclohexyl amine. Examples of the corresponding halogen include fluorine, chlorine, bromine, and iodine compounds.

Any of the activating agents may be used alone or a plurality of kinds thereof can be used in mixture.

The amount of activating component contained in the flux is not limited to a particular amount; for example, the amount of activating component is 0.1 mass % or more and 50 mass % or less, preferably 1.0 mass % or more and 20 mass % or less.

The solvent component is not limited to a particular component as long as the solvent component is any known component that can be used as the solvent component for the flux. Examples of the solvent component include: glycol ethers such as diethylene glycol monohexyl ether (hexyl diglycol), diethylene glycol dibutyl ether (dibutyl diglycol), diethylene glycol mono 2-ethylhexyl ether (2-ethylhexyl diglycol), and diethylene glycol monobutyl ether (butyl diglycol); aliphatic compounds such as n-hexane, isohexane, and n-heptane; esters such as isopropyl acetate, methyl propionate, and ethyl propionate; ketones such as methyl ethyl ketone, methyl n-propyl ketone, and diethyl ketone; and alcohols such as ethanol, n-propanol, isopropanol, isobutanol, and octane diol.

Any of these solvents can be used alone or a plurality of kinds thereof can be used in mixture.

The amount of solvent component contained in the flux is not limited to a particular amount; for example, the amount of solvent component is 1.0 mass % or more and 95 mass % or less, preferably 20 mass % or more and 60 mass % or less.

The thixotropic component is not limited to a particular component as long as the thixotropic component is any known component that can be used as the thixotropic component for the flux. Examples of the thixotropic component include hydrogenated castor oil, aliphatic acid amides, oxy fatty acids, and wax.

The amount of thixotropic component contained in the flux is not limited to a particular amount; for example, the amount of thixotropic component is 0.1 mass % or more and 50 mass % or less, preferably 1.0 mass % or more and 20 mass % or less.

The flux according to the present embodiment may further contain another additive.

The flux according to the present embodiment has an acid value of 120 mgKOH/g or more, preferably 160 mgKOH/g or more, or an acid value of 120 mgKOH/g or more and 250 mgKOH/g or less, preferably an acid value of 160 mgKOH/g or more and 250 mgKOH/g or less, and more preferably an acid value of 170 mgKOH/g or more and 240 mgKOH/g or less.

By having the acid value in the above range, the flux can have a higher effect of keeping the viscosity stability while keeping the solderability.

The acid value of the flux in the present embodiment refers to the acid value that is measured in accordance with JIS Z 3197 "test methods for soldering fluxes" 8.1.4.1.1 acid value test (resins and organics).

The acid value of the flux can be controlled to be within the above range by a method of, for example, selecting a compound with a suitable acid value as the above resin component and the above activating component.

It is preferable to use the resin component with an acid value of 130 mgKOH/g or more and 260 mgKOH/g or less as the resin component other than the terpene phenolic resin because the acid value of the flux is easily controlled to be within the above-described range.

The solder composition according to the present embodiment contains the flux and the solder alloy.

The solder alloy may be a lead-free alloy.

The solder alloy is not limited to a particular alloy and may be either a lead-free (unleaded) solder alloy or a leaded solder alloy; from the viewpoint of the impact on the environmental, the lead-free solder alloy is preferable.

Specific examples of the lead-free solder alloy include alloy containing tin, silver, copper, zinc, bismuth, or antimony, and more specific examples include alloy such as Sn/Ag, Sn/Ag/Cu, Sn/Cu, Sn/Ag/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, and In/Ag. In particular, Sn/Ag/Cu is preferable.

The amount of solder alloy contained in the solder composition is not limited to a particular amount; for example, the amount of solder alloy is 80 mass % or more and 95 mass % or less, preferably 85 mass % or more and 90 mass % or less.

The solder composition according to the present embodiment is obtained by mixing the solder alloy and the flux according to the present embodiment. In the case of producing the solder composition as solder paste, for example, it is preferable that the solder alloy is mixed by 80 mass % or more and 95 mass % or less and the flux is mixed by 5 mass % or more and 20 mass % or less.

The flux according to the present embodiment contains the terpene phenol and has the acid value in the particular range; therefore, in the case where the flux is mixed in the solder composition, the viscosity change can be suppressed while the solderability is kept. In particular, the increase in viscosity during the continuous use of the solder composition can be suppressed effectively.

The flux and the solder composition according to the present embodiment are as described above, and the embodiment disclosed herein should be considered as not restrictive but illustrative in all respects. The scope of the present invention is defined by the appended claims rather than by the foregoing description, and is intended to include any modifications within the meaning and range of equivalency of the claims.

EXAMPLES

Hereinafter, examples of the present invention will be described together with comparative examples. It should be noted that the present invention is not construed as being limited to the following examples.

Fabrication of Flux

The materials shown below were mixed in accordance with Table 1 to produce fluxes for Examples and Comparative examples (% in Table indicates mass %).

A producing method is as below. The materials were put into a heating vessel and heated to 180° C. until it was confirmed that all the materials were dissolved and diffused. After that, the materials were cooled to room temperature and thus, a flux in a uniform state was obtained.

Note that various components such as rosin, the thixo agent, and the activating agent were added alone or mixed, so that the acid value and the viscosity of the flux were adjusted to be within the proper range.

Materials

Rosin: colorless rosin (Arakawa Chemical Industries, Ltd.)

Terpene phenol: YS POLYSTER S145 (YASUHARA CHEMICAL CO., LTD.)

Solvent: main component, hexyl diglycol (NIPPON NYUKAZAI CO., LTD.)

Thixo agent: aliphatic acid bisamide based thixotropic agent

Activating agent: organic acid based activating agent or halogen based activating agent Measurement of Acid Value The acid value of the flux in each of examples and comparative examples was measured.

The acid value was measured in accordance with JIS Z 3197 "test methods for soldering fluxes" 8.1.4.1.1 acid value test (resins and organics).

The results are shown in Table 1.

Fabrication of Solder Composition

Furthermore, solder compositions according to Examples and Comparative examples were produced using the flux.

Regarding the solder composition, solder alloy powder (Sn-3.0% Ag-0.5% Cu, particle diameter of 20 to 38 μm) and the flux were mixed at a ratio of 88±1 mass % and 12±1 mass %, respectively; thus, the solder composition in the paste form was produced.

Measurement of Viscosity Increase Rate

The viscosity increases rate of the solder compositions according to Examples and Comparative examples was measured by the following method.

On a stainless-steel plate, 500 g of each solder composition was applied and a metal squeegee with a length of 27 cm was reciprocated thereon at an angle of 60° with a squeegee speed of 30 mm/s for 30 cm; thus, the solder composition was rolled. The squeegee was moved back and forth at an interval of 15 seconds. After this process is performed continuously for 24 hours, the viscosity of the solder composition was measured using the rotational viscometer of co-axial double cylinder type (product of Malcom Co., Ltd., PCU-205), and the difference in viscosity from the initial viscosity before the continuous use was calculated as the viscosity increase rate.

Measurement of Spreading Degree

The spreading degree of the solder compositions according to examples and comparative examples that was measured in accordance with JIS Z 3284-4 4.1 "wettability and de-wetting test" is shown in Table 1.

Figure 2:
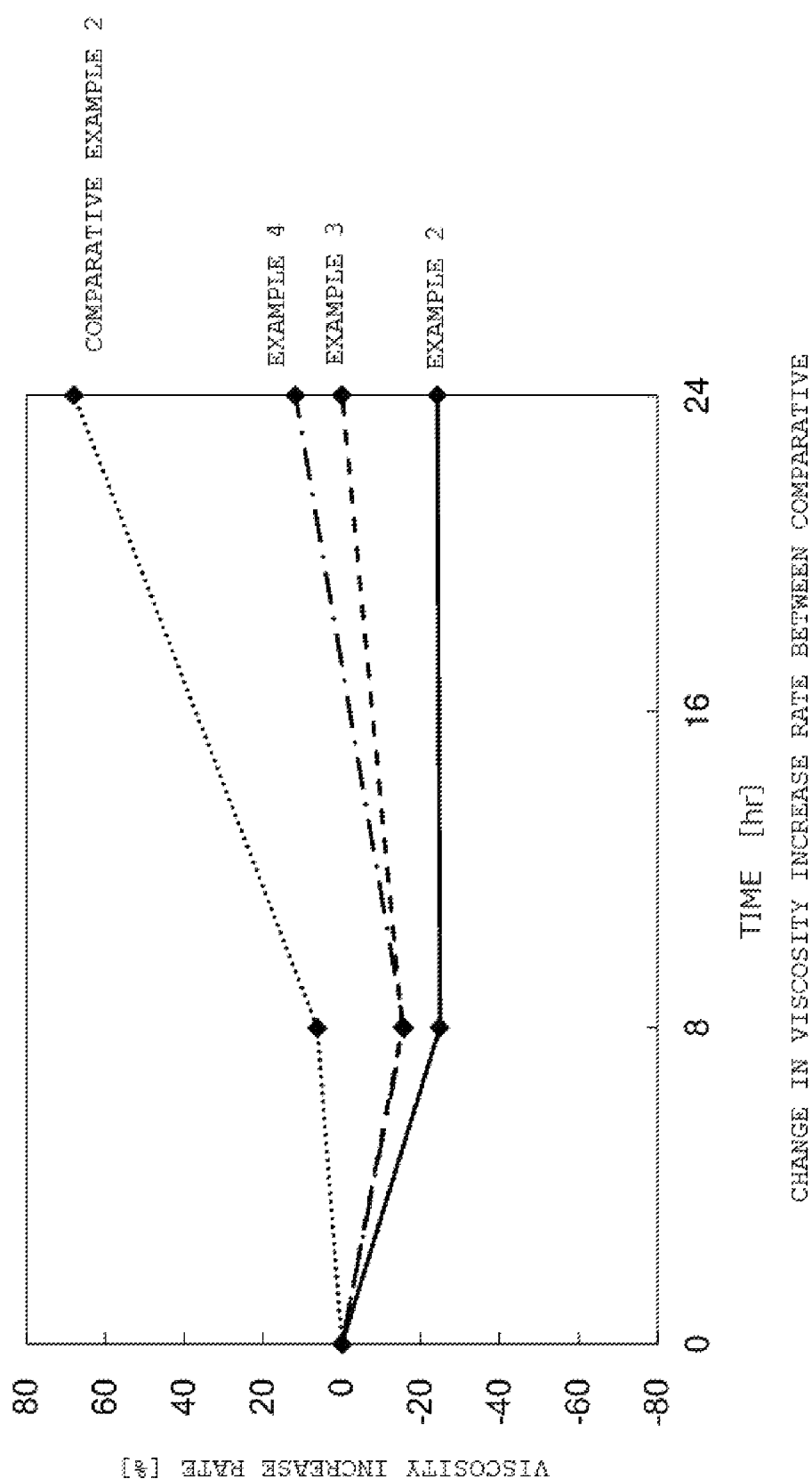
FIG. 2 is a graph showing a relation between the time and the viscosity of fluxes according to examples and comparative example.

The graphs of the relation between the viscosity increase rate and the time (change in viscosity increase rate) is shown in FIG. 1 and FIG. 2.

TABLE 1

| | | Example 1 | Comparative example 1 | Example 2 | Example 3 | Example 4 | Comparative example 2 |
|---|---|---|---|---|---|---|---|
| Flux composition [%] | Rosin | 36.5 | 40.5 | 14.0 | 32.0 | 33.9 | 34.0 |
| | Terpene phenolic resin | 4.0 | 0.0 | 20.0 | 2.0 | 0.1 | 0.0 |
| | Solvent | 46.0 | 46.0 | 50.0 | 50.0 | 50.0 | 50.0 |
| | Thixo agent | 6.5 | 6.5 | 7.0 | 7.0 | 7.0 | 7.0 |

TABLE 1-continued

|  | Example 1 | Comparative example 1 | Example 2 | Example 3 | Example 4 | Comparative example 2 |
|---|---|---|---|---|---|---|
| Organic acid based activating agent | 7.0 | 7.0 | 7.5 | 7.5 | 7.5 | 7.5 |
| Halogen based activating agent | 0.0 | 0.0 | 1.5 | 1.5 | 1.5 | 1.5 |
| Total | 100.0 | 100.0 | 100.0 | 100.0 | 100.0 | 100.0 |
| Ratio of terpene phenolic resin in all resins [%] | 9.9 | 0.0 | 58.8 | 5.9 | 0.3 | 0.0 |
| Viscosity increase rate [%]   0 hr | 0 | 0 | 0 | 0 | 0 | 0 |
| Viscosity increase rate [%]   8 hr | −10 | −13 | −25 | −15 | −16 | 6 |
| Viscosity increase rate [%]   24 hr | −14 | 25 | −24 | 0 | 12 | 68 |
| Flux oxidation [mgKOH/g] | 170 | 178 | 187 | 220 | 235 | 289 |
| Section of spreading degree in JIS | 2 | 2 | 2 | 2 | 2 | 2 |

As shown in Table 1, the viscosity increase rate, after 24 hours, of the solder compositions according to examples in which the flux containing the terpene phenolic resin was used was lower than that of the solder compositions according to comparative examples.

On the other hand, no difference was found in the spreading degree of the solder between examples and comparative examples.

These results indicate that the solder wettability of the solder compositions according to examples is equivalent to that of the solder compositions according to comparative examples; however, the increase in viscosity was remarkably suppressed in the solder composition according to examples as compared to those of comparative examples.

What is claimed is:

1. A flux containing terpene phenolic resin and having an acid value of 120 mgKOH/g or more, wherein the flux contains the terpene phenolic resin and another resin component, that together constitute a rosin component and all resins in the flux composition, and the amount of the terpene phenolic resin contained in the rosin component is from 0.25 mass % or more to 60 mass % or less.

2. The flux according to claim 1, wherein the acid value is 250 mgKOH/g or less.

3. The flux according to claim 1, wherein the amount of terpene phenolic resin contained in the flux is 30 mass % or less.

4. A solder composition comprising the flux according to claim 1, and a solder alloy, mixed together, wherein the solder composition exhibits a viscosity increase rate after 24 hours, of 12 percent or less.

5. The solder composition according to claim 4, wherein the acid value is 250 mgKOH/g or less.

* * * * *